(12) United States Patent
Sogabe et al.

(10) Patent No.: US 6,642,307 B1
(45) Date of Patent: Nov. 4, 2003

(54) PROCESS FOR PRODUCING FLUOROPOLYMER

(75) Inventors: Toshio Sogabe, Settsu (JP); Tatsuya Morikawa, Settsu (JP); Yoshiyuki Tanaka, Settsu (JP); Masanori Kitaichi, Settsu (JP); Mitsuru Kishine, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/807,377

(22) PCT Filed: Oct. 8, 1999

(86) PCT No.: PCT/JP99/05564

§ 371 (c)(1),
(2), (4) Date: Apr. 12, 2001

(87) PCT Pub. No.: WO00/22002

PCT Pub. Date: Apr. 20, 2000

(30) Foreign Application Priority Data

Oct. 13, 1998 (JP) ............................................. 10-290315

(51) Int. Cl.$^7$ ............................ C08L 27/12; C08F 16/24
(52) U.S. Cl. ........................ 524/805; 526/247; 516/75
(58) Field of Search ........................ 516/75; 526/247; 524/805

(56) References Cited

U.S. PATENT DOCUMENTS

| | | | | |
|---|---|---|---|---|
| 4,380,618 A | * | 4/1983 | Khan et al. | 526/247 |
| 4,864,006 A | * | 9/1989 | Giannetti et al. | 526/254 |
| 4,920,170 A | | 4/1990 | Abe et al. | 526/247 |
| 5,523,346 A | * | 6/1996 | Wu | 524/805 |
| 5,608,022 A | * | 3/1997 | Nakayama et al. | 526/245 |
| 5,639,838 A | * | 6/1997 | Albano et al. | 526/247 |
| 5,688,885 A | * | 11/1997 | Blair | 526/247 |
| 5,760,151 A | * | 6/1998 | Aten et al. | 526/247 |
| 6,297,334 B1 | * | 10/2001 | Marchese et al. | 526/206 |

FOREIGN PATENT DOCUMENTS

| | | |
|---|---|---|
| EP | 0789039 A1 | 8/1997 |
| JP | 60-250009 | 12/1985 |

OTHER PUBLICATIONS

Database Derwent on EAST, week 198604, London: Derwent Publications Ltd., AN 1986–026227, JP 60250009 A, (Asashi Chem Ind Co) abstract.*
English translation of International Preliminary Examination Report for PCT/JP99/05564 dated Nov. 22, 2000, Japanese Patent Office.
International Search Report for PCT/JP99/05564, dated Jan. 11, 2000, Japanese Patent Office.

* cited by examiner

Primary Examiner—Daniel S. Metzmaier
(74) Attorney, Agent, or Firm—Sughrue Mion, PLLC

(57) ABSTRACT

In the emulsion obtained by forcedly emulsifying by applying a high shearing force on the water insoluble liquid in the presence of a small amount of emulsifying agent, at least one of fluorine-containing monomers being in the form of gas at ordinary temperature at atmospheric pressure is emulsion-polymerized stably and efficiently. An amount of the emulsifying agent is an amount which does not change the number of water insoluble liquid particles in the emulsion during the polymerization.

10 Claims, No Drawings

PROCESS FOR PRODUCING FLUOROPOLYMER

TECHNICAL FIELD

The present invention relates to a novel process for preparing a fluorine-containing polymer, particularly a process for preparation characterized in that an emulsion prepared by applying a high shearing force is used when preparing the fluorine-containing polymer by emulsion polymerization.

BACKGROUND ART

For preparing a fluorine-containing polymer, various polymerization methods such as emulsion polymerization, suspension polymerization, solution polymerization and bulk polymerization have been employed. Among them, the emulsion polymerization method is widely used for preparing various fluorine-containing polymers from the points that a polymer having a fine particle size can be obtained as a product of polymerization reaction, a polymerization rate is high and a polymer having a high molecular weight can be obtained. Particularly in preparing a fluorine-containing elastomer by using perfluoro(alkyl vinyl ether), the emulsion polymerization method is used from the viewpoint of enabling a polymerization rate and molecular weight to become high.

For example, JP-A-61-223007 and JP-A-1-158002 describe processes for preparing a fluorine-containing elastomer by emulsion-polymerizing tetrafluoroethylene (TFE) and perfluoro(vinyl ether) having a perfluoro polyether group.

However perfluoro(vinyl ether) has a high molecular weight and a long chain and is inferior in polymerization reactivity and water solubility, and therefore is difficult to be introduced into an aimed polymer in a large amount.

In the preparation process described in the above-mentioned JP-A-61-223007, an aimed fluorine-containing elastomer is prepared by using an emulsifying agent having a perfluoro polyether group. Also in the preparation process of the above-mentioned JP-A-1-158002, an inorganic salt is added as an emulsification stabilizer.

Also in JP-A-62-288617, a process of preparing a sulfonic acid type perfluoro carbon by using an emulsifying equipment. In that publication, a perfluoro carbon monomer having sulfonic acid is emulsified in an amount up to ⅕ based on water by using an emulsifying agent in nearly the same amount as in conventional process to give monomer particles having a relatively large average particle size (460 nm at minimum) and then emulsion-polymerized.

However the emulsifying agent and inorganic salt described in the above publications remain in the prepared polymers, and have various influences on post-treatment steps and product quality. For example, in a field of production of semi-conductor, there is a problem with a contamination due to elution of an inorganic salt remaining in a fluorine-containing polymer used on an equipment and vessel, and also in a field of fluorine-containing elastomer, there is a problem with a vulcanization failure attributable to an emulsifying agent.

An object of the present invention is to provide a process for preparing a fluorine-containing polymer which makes it possible to carry out emulsion polymerization effectively by making an amount of emulsifying agent as small as possible and keeping a stable emulsified state without using an emulsification stabilizer.

DISCLOSURE OF INVENTION

Namely the preparation process of a fluorine-containing polymer of the present invention comprises a step for preparing an emulsion in which particles comprising a substance being substantially insoluble in water and being in the form of liquid at ordinary temperature at atmospheric pressure are dispersed and a step for polymerizing at least one of fluorine-containing ethylenic unsaturated monomers in the emulsion. The preparation process is characterized in that the liquid particles in the emulsion which are insoluble in water substantially comprise a polymerizable monomer or a mixture of a polymerizable monomer and a chain transfer agent, a weight of the liquid particles in the emulsion which are insoluble in water substantially is ¼ or more based on a weight of an aqueous medium in the emulsion and at least one of fluorine-containing ethylenic unsaturated monomers is in the form of gas at ordinary temperature at atmospheric pressure. A volume average particle size of the liquid particles being insoluble in water substantially is, for example, not more than 450 nm, preferably 30 to 350 nm, more preferably 80 to 250 nm.

In the present invention, in order to reduce an amount of emulsifying agent and obtain a stable emulsified state even if an emulsification stabilizer is not added, it is preferable to forcedly emulsify in the above-mentioned step for preparing the emulsion by applying a high shearing force on a mixture of the water insoluble liquid and water.

In the present invention, it is preferable that the step for preparing the emulsion comprises a pre-emulsifying step for preparing an emulsion containing the water insoluble liquid having a volume average particle size larger than 450 nm by pre-stirring in the presence of an emulsifying agent and a step for forcedly emulsifying the obtained pre-emulsified solution as it is with an emulsifying equipment to reduce the volume average particle size of the water insoluble liquid particles to not more than 450 nm, preferably 30 to 350 nm, more preferably 80 to 250 nm.

The emulsion obtained by the preparation step of the present invention is characterized in that the emulsion contains $10^{13}$ to $10^{17}$ particles of water insoluble liquid per 1 ml of water and an amount of the emulsifying agent is as small as $1 \times 10^{-6}$ mg or less per $10^5$ particles of water insoluble liquid. By using the emulsifying agent in the amount mentioned above, the number of liquid particles (particles of monomer or a mixture of monomer and prepared polymer) does not change substantially throughout the polymerization step.

In the preparation process of the present invention, it is preferable that the fluorine-containing ethylenic unsaturated monomer in the form of gas at ordinary temperature at atmospheric pressure is at least one of tetrafluoroethylene, vinylidene fluoride, vinyl fluoride, hexafluoropropylene and perfluoro(alkyl vinyl ether) and that the above-mentioned water insoluble polymerizable liquid monomer is at least one of perfluoro(vinyl ethers) in the form of liquid at ordinary temperature at atmospheric pressure which are represented by the formula (I):

$$CF_2=CFOR_f \qquad (I)$$

wherein $R_f$ is a perfluoroalkyl group having 1 to 5 carbon atoms or a perfluoroalkyl (poly)vinyl ether group having 1 to 3 oxygen atoms and 3 to 12 carbon atoms.

Also it is preferable that the polymerization is carried out while decreasing a polymerization pressure so that a proportion of recurring units in polymer becomes constant.

The preparation process of the present invention is suitable particularly for preparation of a fluorine-containing elastomer having a glass transition temperature of not more than 25° C.

BEST MODE FOR CARRYING OUT THE INVENTION

At first the fluorine-containing polymer to be prepared by the preparation process of the present invention and a starting monomer are explained below.

The preparation process of the present invention is suitable for polymerization of a fluorine-containing ethylenic unsaturated monomer or a mixture of the fluorine-containing ethylenic unsaturated monomers, wherein at least one is in the form of gas at ordinary temperature (about 20° C.) at atmospheric pressure (about 1 atm). Examples of the fluorine-containing ethylenic unsaturated monomer in the form of gas at ordinary temperature at atmospheric pressure are, for instance, TFE, vinylidene fluoride (VdF), trifluoroethylene, chlorotrifluoroethylene, vinyl fluoride, hexafluoropropylene (HFP), pentafluoropropylene, perfluoro(methyl vinyl ether), and the like. Those monomers may be used solely, in a mixture of two or more thereof or in combination with other copolymerizable monomer mentioned below. Examples of the other copolymerizable monomer are, for instance, ethylene, propylene, and the like. Those copolymerizable monomers are introduced in the emulsion under pressure.

On the other hand, when the polymerizable liquid monomer is used as the water insoluble liquid constituting the emulsion in the present invention, a copolymer of the above-mentioned fluorine-containing ethylenic unsaturated monomer and the polymerizable liquid monomer can be prepared. Examples of the water insoluble polymerizable liquid monomer are, for instance, at least one or two or more of perfluoro(vinyl ethers) represented by the formula (I):

$$CF_2=CFOR_f \quad (I)$$

wherein $R_f$ is a perfluoroalkyl group having 1 to 5 carbon atoms or a perfluoroalkyl (poly)vinyl ether group having 1 to 3 oxygen atoms and 3 to 12 carbon atoms. Examples of perfluoro(vinyl ethers) are, for instance, perfluoro(alkyl vinyl ethers) (PAVE) such as perfluoro(propyl vinyl ether) (PPVE) and $CF_3CF_2CF_2O(CF(CF_3)CF_2O)_2CF=CF_2$. When imparting crosslinkability (vulcanizability), an iodine-containing monomer such as perfluoro(6,6-dihydro-6-iodo-3-oxa-1-hexene) or perfluoro(5-iodo-3-oxa-1-pentene) (cf. JP-B-6-60120) may be used together. Further it is possible to use a monomer which is used for preparation of a chemical sensor, separation membrane, high molecular polymer super acid catalyst, proton permeable polymer electrolyte for fuel batteries, and the like. Examples thereof are, for instance, fluorosulfonate monomers represented by $CF_2=CFO(CF_2CF(CF_3)O)_m$—$(CF_2)_nSO_2X$, wherein m is 0, 1 or 2, n is from 1 to 4, X is F, OH or OM, in which M is Li, Na, K, Rb, Cs or the like and an alkali metal is preferable, fluorocarboxylic acid monomers or fluorocarboxylate monomers represented by $CF_2=CFO(CF_2CF(CF_3)O)_m$—$(CF_2)_nCOOX^1$, wherein m and n are as defined above, $X^1$ is H or M, in which M is the same metal atom as above, fluorocarboxylic acid monomers or fluorocarboxylate monomers represented by $CH_2=CFCF_2O(CF(CF_3)CF_2O)_mCF(CF_3)COOX^1$, wherein m and $X^1$ are as defined above, fluoroalcohol monomers represented by $CH_2=CFCF_2O(CF(CF_3)CF_2O)_mCF(CF_3)OX^1$, wherein m and $X^1$ are as defined above, and the like.

It is possible that the water insoluble liquid is a mixture of a chain transfer agent and polymerizable liquid monomer. Examples of the chain transfer agent which is insoluble in water and is in the form of liquid at ordinary temperature at atmospheric pressure are, for instance, hydrocarbons having 5 to 6 carbon atoms such as pentane and hexane; esters such as ethyl acetate; iodine compounds such as 1,4-diiodoperfluorobutane and diiodomethane; bromine compounds such as 1,2-dibromotetrafluoroethane; and the like.

Non-restricted examples of preferable combination of the fluorine-containing ethylenic unsaturated monomer, polymerizable liquid monomer and chain transfer agent are, for instance, as follows.

(1) Fluorine-containing ethylenic unsaturated monomer: TFE
Polymerizable liquid monomer:

$$CF_3CF_2CF_2O(CF(CF_3)CF_2O)_2CF=CF_2$$

Chain transfer agent: Iodine compound $$I(CF_2)_4I$$

(Effect) An amount of emulsifying agent can be reduced.

(2) Fluorine-containing ethylenic unsaturated monomer: TFE
Polymerizable liquid monomer:
Perfluoro(ethyl vinyl ether)
Chain transfer agent: Ethyl acetate
(Effect) An amount of emulsifying agent can be reduced.

(3) Fluorine-containing ethylenic unsaturated monomer: TFE, VdF
Polymerizable liquid monomer:

$$CF_3CF_2CF_2O(CF(CF_3)CF_2O)_2CF=CF_2$$

Chain transfer agent: Iodine compound $$I(CF_2)_4I$$

(Effect) An amount of emulsifying agent can be reduced.

In the present invention, a "liquid being insoluble in water substantially" means a substance which is a liquid at ordinary temperature at atmospheric pressure and has a solubility in water at 25° C. of not more than 100 g/liter.

One of the features of the preparation process of the present invention is to prepare an emulsion which does not change in the number of water insoluble liquid particles having a volume average particle size of not more than 450 nm, preferably 30 to 350 nm, more preferably 80 to 250 nm in the polymerization step.

As mentioned above, in order to make the volume average particle size of water insoluble liquid smaller and maintain the liquid stably, an excess amount of emulsifying agent is required usually. This is because by an action of stirring in the polymerization step and an action of the excessive emulsifying agent, the number of liquid particles is increased and the volume average particle size of an obtained polymer becomes uniform. On the other hand, if an amount of the emulsifying agent is too small, the liquid particles become unstable. An optimum amount of the emulsifying agent in the emulsion is an amount for covering the liquid particles having a volume average particle size of not more than 450 nm or a slightly excess amount. However in conventional stirring method, a stable emulsion cannot be prepared in the optimum amount of emulsifying agent. Therefore in the present invention, a method of forcedly applying a high shearing force which is so-called a forcedly emulsifying method explained below is employed.

The forcedly emulsifying method is a method for emulsifying and dispersing for forming the water insoluble liquid into fine particles having a volume average particle size of not more than 450 nm by adding the emulsifying agent in a mixture of water and water insoluble liquid in the above-mentioned optimum amount and applying a high shearing force on the mixture.

The method for applying a high shearing force may be a method being capable of generating a high shearing force, for example, a method of using various emulsifying equipments (pressure homogenizer), particularly a high pressure homogenizer, a method of using a line mixer and a method of using a capillary. Examples of the high pressure homogenizer are, for instance, MICROFLUIDIZER Model M-210E/H available from Microfluidics International Corporation and GAULIN homogenizer available from Kabushiki Kaisha Nippon Seiki Seisakusho.

Forcedly emulsifying conditions vary depending on a forcedly emulsifying method to be employed, aimed volume average particle size, the aimed number of particles per 1 ml of water, etc. and may be optionally selected. For example, when using a high pressure homogenizer, the volume average particle size of the water insoluble liquid can be reduced to 450 nm or lower by operating the homogenizer at a pressure of 250 to 2,100 kgf/cm$^2$G.

The forced emulsification may be carried out immediately on the dispersion comprising a mixture of water, water insoluble liquid and emulsifying agent. However it is preferable to carry out the forced emulsification after pre-emulsification of the mixture from the point that the water insoluble liquid particles having a uniform particle size can be prepared.

The pre-emulsification can be carried out by conventional method by using, for example, an atmospheric pressure high speed stirring type homogenizer (ULTRA-DISPERSER Model LK-41 available from Yamato Chemical Co., Ltd.), or the like. However in the present invention since an amount of the emulsifying agent is smaller than that of conventional method, the volume average particle size of the water insoluble liquid cannot be reduced to 450 nm or lower only by the pre-emulsification. In the present invention, the volume average particle size of the water insoluble liquid is reduced to about 1 μm to about 10 μm, preferably 1 to 5 μm by the pre-emulsification.

Another feature of the present invention is that as mentioned above, the amount of emulsifying agent in the emulsion is such an amount as not changing substantially the number of particles comprising the water insoluble liquid and produced polymer in the polymerization step. The meaning of not changing substantially is that the number of particles per 1 ml of water calculated by the following equation from a volume $V_1$ (cm$^3$) of the un-reacted water insoluble liquid and a volume $V_2$ (cm$^3$) of the produced polymer which are contained per 1 ml of water in the emulsion and the volume average particle size r (cm) of particles comprising the un-reacted water insoluble liquid and produced polymer does not change substantially.

$$\text{Number of particles per unit amount of water} = (V_1+V_2)/(4/3\pi r^3)$$

Such an amount (weight) of emulsifying agent varies depending on kind and emulsifying ability of the emulsifying agent, kind and amount of the water insoluble liquid, aimed volume average particle size, kind and amount of the gaseous fluorine-containing ethylenic unsaturated monomer to be reacted, and the like, and cannot be decided unconditionally. An optimum amount thereof is decided experimentally. In case of $10^{14}$ particles of water insoluble liquid per 1 ml of water which have a volume average particle size of 80 to 250 nm, an amount of the emulsifying agent is $1\times10^{-9}$ to $1\times10^{-6}$ mg, preferably $1\times10^{-9}$ to $1\times10^{-7}$ mg per $10^5$ particles of water insoluble liquid. In conventional method, in order to stabilize the same number of liquid particles, an emulsifying agent of $5\times10^{-6}$ mg or more is required per $10^5$ particles of water insoluble liquid.

Though it is not restricted in the present invention, for example, in order to obtain $10^{13}$ to $10^{15}$ particles per 1 ml of water by dispersing 0.9 g of perfluoro(alkyl vinyl ether) represented by $CF_3CF_2CF_2O(CF(CF_3)CF_2O)_2CF{=}CF_2$ per 1 ml of water, 0.018 to 0.11 g of ammonium perfluorooctanoate as an emulsifying agent suffices per 1 ml of water. On the other hand, in conventional polymerization method, only in such an amount of emulsifying agent, a reactivity of the above-mentioned perfluoro(alkyl vinyl ether) is lowered, a polymer having a desired proportion of recurring units cannot be obtained and for example, even if a polymer in the form of elastomer is intended to prepare, the polymer becomes in the resinous form.

An emulsifying agent which can be suitably used in the present invention is not limited particularly. For example, a salt of fluorocarboxylic acid having a fluorocarbon chain or fluoropolyether chain, a salt of fluorosulfonic acid having a fluorocarbon chain or fluoropolyether chain, and the like are preferable from the point that a chain transfer reaction with molecules of the emulsifying agent during the polymerization can be inhibited. Particularly since an ammonium salt of those emulsifying agents does not contain a metal component, they are also suitable for the case where the produced polymer is used in the field of semi-conductor production apparatuses which are adversely influenced by mixing of metal components.

Examples of the fluorocarboxylic acid salt are, for instance, $CF_3(CF_2)_n COONH_4$ (n=6 to 8), $CHF_2(CF_2)_n COONH_4$ (n=6 to 8), $C_3F_7O(CF(CF_3)CF_2O)_n CF(CF_3)COONH_4$ (n=0 to 2), and the like.

Examples of the fluorosulfonic acid salt are, for instance, $CF_3(CF_2)_n SO_3NH_4$ (n=6 to 8), $CHF_2(CF_2)_n SO_3NH_4$ (n=6 to 8), $C_3F_7O(CF(CF_2)CF_2O)_n CF(CF_3) SO_3NH_4$(n=0 to 2), and the like.

In the so-obtained emulsion, at least one of the above-mentioned fluorine-containing ethylenic unsaturated monomers which is in the form of gas at ordinary temperature at atmospheric pressure is polymerized. The polymerization conditions may be the same as in conventional polymerization method. The polymerization may be carried out at a polymerization temperature of 5° to 100° C. at a polymerization pressure of 0.1 to 7 MPa.

Preferably the polymerization pressure is decreased gradually so that a proportion of recurring units in the obtained fluorine-containing polymer becomes constant throughout the polymerization step. The meaning of the proportion of recurring units becoming constant is that a ratio of monomers reacted in unit time is constant.

As a polymerization initiator, conventional one can be used. Examples thereof are, for instance, organic or inorganic peroxides, azo compounds, and the like. In order to prevent mixing of metal components particularly from the viewpoint of cleanliness, ammonium salt, peroxy carbonate, peroxy ester, and the like are preferable. Particularly ammonium persulfate (APS) is preferable. APS may be used solely or in combination with a reducing agent such as sulfites.

When the polymerization is carried out with a pH value of the emulsion being maintained at a weak alkali level of about 7 to about 10, in case where a metallic polymerization vessel is used for the polymerization, mixing of metal components due to corrosion of the metallic surface of the vessel can be prevented. Non-restricted examples of pH control agent are ammonia compounds such as aqueous ammonia and ammonium carbonate.

Then the present invention is explained by means of examples, but is not limited to them.

EXAMPLE 1

A 5-liter beaker made of PFA was charged with 2,540 g of pure water, 114 g of emulsifying agent (ammonium perfluorooctanoate), 2,284 g of perfluoro(alkyl vinyl ether) (PAVE) represented by $CF_3CF_2CF_2O(CF(CF_3)CF_2O)_2CF=CF_2$, 22.7 g of $ICH_2CF_2CF_2OCF=CF_2$, 12.7g of pH control agent (ammonium carbonate) and 3.5 g of 1,4-diiodoperfluorobutane, followed by mixing for 60 seconds with an emulsifying equipment (ULTRA-DISPERSER Model LK-41 available from Yamato Chemical Co., Ltd.) to give a pre-emulsified solution having a volume average particle size of 2 $\mu$m. The volume average particle size at pre-emulsifying was measured with a MICROTRACK particle size distribution meter HRA9320-X100 available from Nikkiso Kabushiki Kaisha.

The obtained pre-emulsified solution was immediately emulsified at an emulsifying pressure of 1,000 kgf/cm$^2$G with a forced emulsification equipment (MICROFLUIDIZER Model M-210E/H available from Microfluidics International Corporation) to give an emulsion.

The volume average particle size of water insoluble liquid particles in the emulsion which was measured with a MICROTRACK UPA150 particle size distribution meter Model 9340 available from Nikkiso Kabushiki Kaisha was 181 nm. The number of particles per 1 ml of water which could be calculated from the volume average particle size and an amount of PAVE contained in the emulsion was $1.65 \times 10^{14}$, and an amount of the emulsifying agent per $10^5$ particles of water insoluble liquid in the emulsion was $2.73 \times 10^{-8}$ mg. A pH value of the emulsion was 8.9.

A 6000 ml pressure resistant stainless steel reactor was charged with 4,350 g of the obtained emulsion and 6.6 g of ammonium sulfite (hydrate). After replacing the inside of reactor with nitrogen gas sufficiently, a temperature inside the reactor was decreased to 15° C. and the reactor was evacuated with stirring, followed by pressurizing up to 4.7 kgf/cm$^2$G with a fluorine-containing monomer (TFE) gas. By introducing 5.4 ml of aqueous solution of 0.88% by weight of polymerization initiator (APS) under pressure, immediately a polymerization reaction started and a decrease in a pressure arose. When the pressure lowered down to 3.0 kgf/cm$^2$G, 59 g of TFE gas was additionally introduced to maintain the pressure at 3.0 kgf/cm$^2$G. When the additional introduction was terminated, lowering of the pressure arose, and when the pressure lowered down to 2.0 kgf/cm$^2$G, 95 g of TFE gas was additionally introduced to maintain the pressure at 2.0 kgf/cm$^2$G. When the additional introduction was terminated, lowering of the pressure arose, and when the pressure lowered down to 1.0 kgf/cm$^2$G, 98 g of TFE gas was further introduced additionally to maintain the pressure at 1.0 kgf/cm$^2$G. At the time when the additional introduction was terminated, the pressure was released and the polymerization was stopped. During the polymerization, 5.4 ml of aqueous solution of 0.88% by weight of APS was introduced under pressure every three hours. As a result, 4,849 g of an aqueous dispersion of fluorine-containing polymer was obtained.

The polymerization time was 17 hours and 7 minutes. With respect to the obtained aqueous dispersion, a solid content was 23.2% by weight, a pH value was 8.3, a volume average particle size of the fluorine-containing polymer particles was 191 nm, and the number of particles per 1 ml of water was $1.62 \times 10^{14}$.

The fluorine-containing polymer was an elastomer, and a proportion (% by mole ratio) of recurring units therein was TFE/PAVE =77.5/22.5.

EXAMPLE 2

An emulsion was prepared in the same manner as in Example 1 except that an emulsification pressure was 300 kgf/cm$^2$G and an amount of emulsifying agent was 47.7 g in the forced emulsifying step by using a forced emulsification equipment. A volume average particle size of water insoluble liquid particles in the emulsion was 281 nm, and the number of particles per 1 ml of water was $4.40 \times 10^{13}$. A pH value of the emulsion was 8.8, and an amount of emulsifying agent per $10^5$ particles of water insoluble liquid was $4.27 \times 10^{-8}$ mg.

APS was added in the same manner as in Example 1 to start a polymerization. The polymerization was carried out for 38 hours and 42 minutes to give 4,820 g of an aqueous dispersion of fluorine-containing polymer. The fluorine-containing polymer was an elastomer, and a proportion (% by mole ratio) of recurring units therein was TFE/PAVE= 77.2/22.8.

A solid content of the obtained aqueous dispersion was 22.9% by weight, and a pH value thereof was 8.4. A volume average particle size of the fluorine-containing polymer particles in the aqueous dispersion was 296 nm, and the number of particles per 1 ml of water was $4.32 \times 10^{13}$.

EXAMPLE 3

A 6000 ml pressure resistant stainless steel reactor was charged with 4,350 g of emulsion prepared in the same manner as in Example 1 and 6.6 g of a hydrate of ammonium sulfite, and the inside of the reactor was replaced with nitrogen gas sufficiently. After the reactor was evacuated at 15° C. with stirring, a pressure inside the reactor was increased up to 2.5 kgf/cm$^2$G with TFE gas. An aqueous solution of 0.88% by weight of APS was added in an amount of 5.4 ml to initiate a polymerization. Since the pressure inside the reactor lowered with advance of the polymerization, TFE gas was introduced additionally to maintain the reaction pressure. Also every three hours, 5.4 ml of aqueous solution of 0.88% by weight of APS was supplied under pressure. At the time when an amount of TFE introduced additionally reached 420 g (18 hours after), the pressure was released and the polymerization was terminated. Thus 4,850 g of an aqueous dispersion containing fluorine-containing polymer particles was obtained. The fluorine-containing polymer was an elastomer, and a proportion (% by mole ratio) of recurring units therein was TFE/PAVE=77.6/22.4.

A solid content of the obtained aqueous dispersion was 23.0% by weight, and a pH value thereof was 8.3. A volume average particle size of the fluorine-containing polymer particles in the aqueous dispersion was 190 nm, and the number of particles per 1 ml of water was $1.65 \times 10^{14}$.

EXAMPLE 4

Acetone was added to the aqueous dispersions obtained in Examples 1 and 3, respectively and then hydrochloric acid was added for coagulation. An obtained coagulant was washed with acetone, followed by drying under reduced pressure to give a fluorine-containing elastomer.

After 15 parts by weight of medium thermal carbon and PERHEXA 2.5 B (organic peroxide available from NOF CORPORATION) and 3.0 parts by weight of triallylisocyanurate (TAIC) as vulcanization agents were kneaded with 100 parts by weight of the obtained fluorine-containing elastomer, press vulcanization was carried out at 160° C. for 10 minutes, followed by vulcanization in an oven at 180° C. for four hours to give a vulcanized article. Physical properties (tensile strength, elongation, hardness and compression set) of the obtained vulcanized article were measured by the following methods.

(Tensile strength and elongation)

According to JIS K 6301.

(Hardness)

According to JIS K 6253 Type A.

(Compression set)

Measured according to JIS K 6301 under the conditions of 200° C., 70 hours and 25% compression by using a dynamic O-ring P-24 specified in JIS B 2401.

A tensile strength, elongation, hardness and compression set of the fluorine-containing elastomer prepared in Example 1 were 108 kgf/cm$^2$, 95%, 74 and 22%, respectively. A tensile strength, elongation, hardness and compression set of the fluorine-containing elastomer prepared in Example 3 were 141 kgf/cm$^2$, 102%, 83 and 33%, respectively. The elastomer of Example 1 was excellent particularly in a balance of physical properties, and the elastomer of Example 3 was excellent in a tensile strength, but has a high hardness and was inferior in compression set. It can be considered that this was because since the polymerization was carried out with the polymerization pressure maintained constant, non-uniform distribution of a proportion of recurring units occurred in the produced polymer.

INDUSTRIAL APPLICABILITY

According to the preparation process of the present invention, emulsion polymerization of a fluorine-containing monomer can be carried out stably and efficiently, and a uniform fluorine-containing polymer can be prepared.

What is claimed is:

1. A process for preparing a fluorine-containing polymer, which comprises a step for preparing an emulsion in which particles comprising a substance being substantially insoluble in water being in the form of liquid at 20° at 1 atm, and comprising a polymerizable monomer or a mixture of a polymerizable monomer and chain transfer agent are dispersed and a step for polymerizing at least one fluorine-containing ethylenic unsaturated monomer and said polymerizable monomer in the emulsion; wherein, a weight of said substance is ¼ or more based on a weight of an aqueous medium in the emulsion, a volume average particle size of said particles in the emulsion which are substantially insoluble in water is 80 to 250 nm prior to polymerizing and said at least one fluorine-containing ethylenic unsaturated monomer is in the form of gas at 20° at 1 atm.

2. The preparation process of claim 1, wherein said step for preparing the emulsion is carried out by applying a high shearing force.

3. The preparation process of claim 1, wherein a weight of said substance is ½ or more based on a weight of an aqueous medium in the emulsion.

4. The preparation process of claim 1, wherein a weight of an emulsifying agent in the emulsion is less than ¼ based on a weight of the water insoluble liquid particles in the emulsion.

5. The preparation process of claim 1, wherein the number of particles of water insoluble liquid in the emulsion is 10$^{13}$ to 10$^{17}$ per 1 ml of water and an amount of an emulsifying agent in the emulsion is 1×10$^{-6}$ mg or less per 10$^5$ particles of water insoluble liquid.

6. The preparation process of claim 1, wherein said step for preparing the emulsion comprises preparing an emulsion which contains particles of the water insoluble liquid having a volume average particle size larger than 450 nm by emulsifying in the presence of an emulsifying agent and then forcedly further emulsifying the emulsion with an emulsifying equipment to reduce the volume average particle size of the water insoluble liquid particles to not more than 250 nm.

7. The preparation process of claim 1, wherein said at least one fluorine-containing ethylenic unsaturated monomer in the form of gas at 20° C. at 1 atm is at least one of tetrafluoroethylene, vinylidene fluoride, vinyl fluoride, hexafluoropropylene and perfluoro(alkyl vinyl ether) and said water insoluble polymerizable monomer is at least one of perfluoro(vinyl ethers) in the form of liquid at 20° C. at 1 atm which are represented by the formula (I):

$$CF2=CFORf \tag{I}$$

wherein Rf is a perfluoroalkyl group having 1 to 5 carbon atoms or a perfluoroalkyl (poly)vinyl ether group having 1 to 3 oxygen atoms and 3 to 12 carbon atoms.

8. The preparation process of claim 1, wherein the polymerization is carried out while decreasing a polymerization pressure so that a proportion of recurring units of the obtained fluorine-containing polymer becomes constant.

9. The preparation process of claim 1, wherein the obtained fluorine-containing polymer is a fluorine-containing elastomer having a glass transition temperature of not more than 25C.

10. The preparation process of claim 1, which comprises preparing said emulsion in the presence of an emulsifying agent comprising a salt of perfluorooctanic acid.

* * * * *